April 6, 1954   G. W. FINDLEY   2,674,278
CHAIN SAW ATTACHMENT FOR TRACTORS
Filed Jan. 25, 1951   2 Sheets-Sheet 1
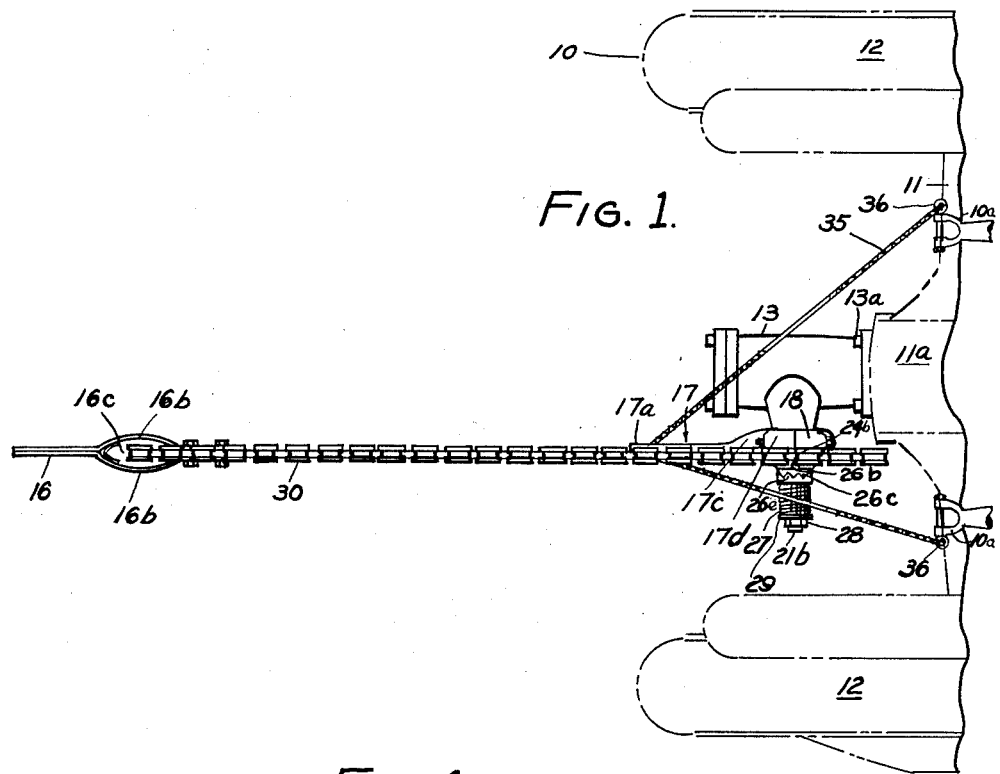
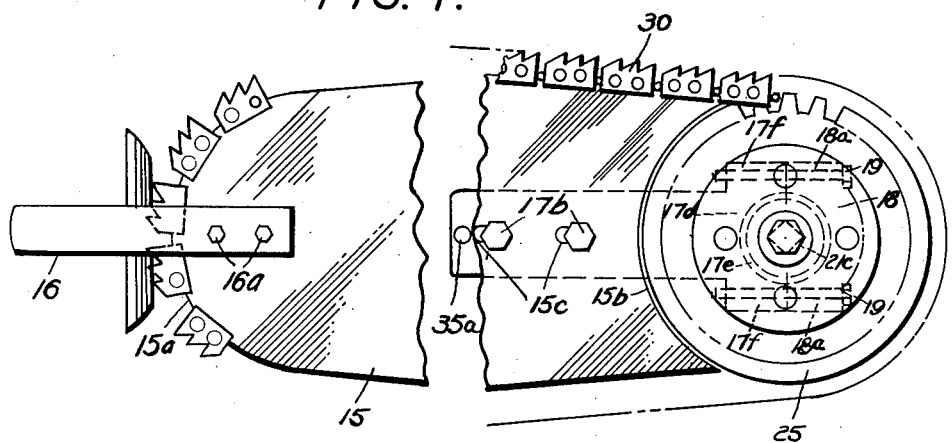
INVENTOR.
GEORGE W. FINDLEY
BY
ATTORNEY April 6, 1954 G. W. FINDLEY 2,674,278
CHAIN SAW ATTACHMENT FOR TRACTORS
Filed Jan. 25, 1951 2 Sheets-Sheet 2
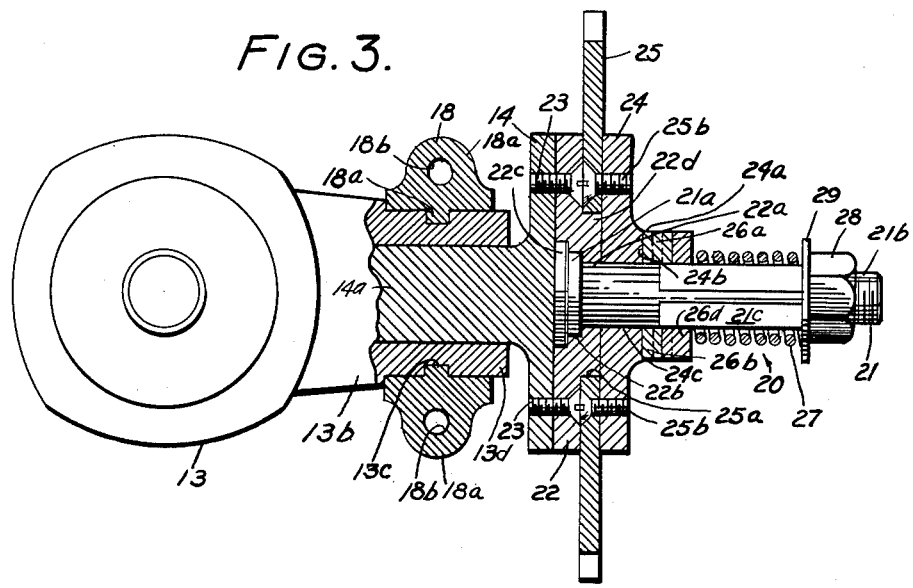
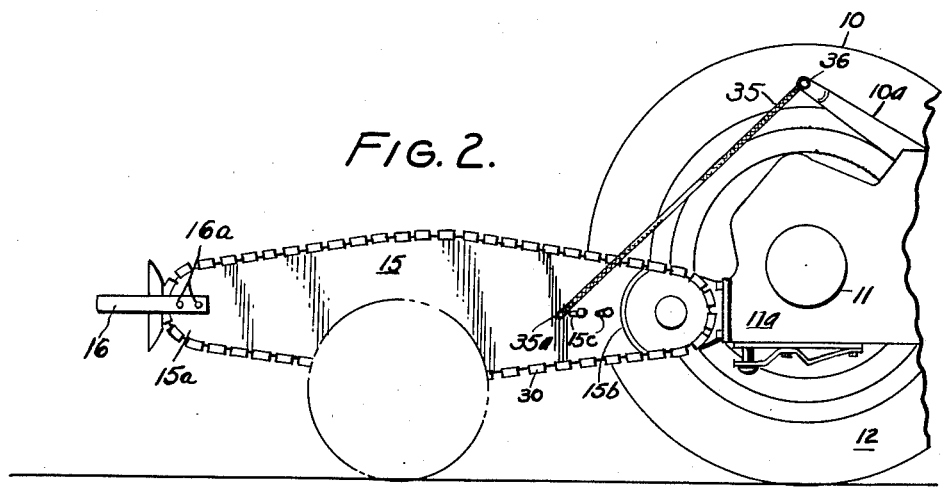
INVENTOR.
GEORGE W. FINDLEY
BY
ATTORNEY

Patented Apr. 6, 1954

2,674,278

UNITED STATES PATENT OFFICE 2,674,278

CHAIN SAW ATTACHMENT FOR TRACTORS

George W. Findley, Dearborn, Mich., assignor, by mesne assignments, to Ford Motor Company, Dearborn, Mich., a corporation of Delaware Application January 25, 1951, Serial No. 207,736

5 Claims. (Cl. 143—32)

This invention relates to an improved chain saw and more particularly to an improved chain saw for attachment to the power-take-off shaft of a tractor for powering such saw.

Chain saws have become increasingly popular for felling trees and cutting logs into readily handled lengths. The primary advantage of a chain type of saw is that logs of large diameter can be conveniently cut through without repositioning of the saw and such cutting is performed with comparative safety. While there have been developed portable, self-powered and compact chain saws which efficiently perform their work, the cost of such saws is still relatively high. For the farmer who has need for such power driven equipment, but who does not have a large annual volume of wood cutting to do, the investment in a chain type of saw is generally not warranted. However, every modern farmer does have a convenient power source in his tractor which is well suited for powering a chain type of saw.

Accordingly, it is an object of this invention to provide an improved chain type saw which is readily mountable on the power-take-off of a tractor for powering such saw and utilizes the tractor's power lifted hitch links to control the feeding of the saw.

Another object of this invention is to provide an improved tractor powered chain type saw which is inexpensive to manufacture, can be readily attached to or detached from a tractor, and can be readily transported to the working area by the tractor.

The specific nature of this invention, as well as other objects and advantages thereof, will become apparent to those skilled in the art from the following detailed description, taken in conjunction with the attached sheets of drawings on which, by way of preferred example only is illustrated one embodiment of this invention.

On the drawings:

Fig. 1 is a plan view of the improved chain saw of this invention shown mounted on the power-take-off pulley of a tractor.

Fig. 2 is a side elevational view of Fig. 1 showing the chain saw in horizontal cutting position.

Fig. 3 is an enlarged detail sectional view showing the clutch incorporated in the saw utilized to prevent overloading of the chain saw when in operation.

Fig. 4 is an enlarged fragmentary side view of the chain saw.

As shown on the drawings:

In Fig. 1 there is shown the rear end portion of a tractor 10 of well-known make provided with a pair of laterally spaced power operated lift arms 10a and having a rear axle housing 11 supported by a pair of wheels 12. A power-take-off shaft (not shown) projects out of a central housing portion 11a of axle housing 11 and a conventional pulley drive mechanism (not shown) contained within a substantially T-shaped housing 13 is secured to the central housing 11a by a plurality of bolts 13a. The power-take-off shaft of the tractor 10 cooperates with the pulley drive mechanism in driving relationship in a well-known manner. Pulley housing 13 may be mounted on the portion 11a of housing 11 in a plurality of positions so that the usual pulley (not shown) associated with housing 13 may be positioned in a downwardly projecting vertical axis position or in a horizontal axis position on either the right or left hand side of the axis of the power-take-off shaft. In the practice of this invention, however, the pulley commonly provided with pulley housing 13 is removed and only the flange 14 (Fig. 3) utilized for mounting and driving such pulley is here shown. Flange 14 has a shaft portion 14a journalled within a hollow stem portion 13b of the pulley drive housing 13, such flange being power driven through a bevel gear arrangement (not shown) within housing 13 by the power-take-off shaft of the tractor.

The improved chain saw illustrated on the appended drawings and constructed in accordance with this invention comprises a plate-like saw guide 15. Guide 15 is somewhat oval shaped as best shown in Fig. 2 and such guide has a rounded end portion 15a. A rearwardly projecting handle 16 is secured to the arcuate end 15a of guide 15 by a pair of bolts 16a. Handle 16 comprises a pair of strap members each having a substantially semi-elliptical portion 16b provided in the center thereof as best shown in Fig. 1. When each of the strap members are placed in abutting relationship, the U-shaped portion 16b defines a substantially oval shaped ring or aperture 16c for a purpose to be later explained. The trailing ends of the straps are welded together while the forward ends are respectively placed in abutting relationship to opposite sides of saw guide 15 and are suitably apertured to receive the bolts 16a which secure handle 16 to guide 15.

The forward end of guide 15 is secured to stem portion 13b of housing 13 by a bracket 17. Bracket 17 has an arm portion 17a which is secured to the forward end of guide 15 by a pair of bolts 17b, such bolts respectively passing through longitudinally slotted apertures 15c provided in guide 15 for a purpose to be explained.

An offset portion 17c is provided adjacent the forward end of the arm portion 17a terminating in a semi-cylindrical end portion 17d which snugly surrounds one half of a cylindrical surface 13d (Fig. 3) provided on stem portion 13b of the pulley housing. The cylindrical surface 13d has an annular groove 13c therein which receives a corresponding integral annular lug 17e (Fig. 4) provided on the interior wall of the semi-cylindrical end 17d of arm 17. A pair of opposed integral bosses 17f are provided on the exterior of the end 17d of arm 17 and each of such bosses are provided with threaded apertures for a purpose to be presently explained.

A semi-cylindrical cap 18 surrounds the other half of the cylindrical surface 13d of stem portion 13b. A pair of integral bosses 18a having apertures 18b are provided on cap 18 and when such cap is placed in surrounding relationship to the cylindrical end of stem 13b, apertures 18b will be aligned with corresponding apertures provided in the arcuate end 17d of arm 17 whereupon a pair of bolts 19 may be respectively threadably inserted in such holes to secure cap 18 to the end 17d and hence to secure arm 17 to the cylindrical portion 13d of stem portion 13b. It should be mentioned here that cap 18 is also provided with an annular lug 18a (Fig. 3) on the interior surface thereof which cooperates with the mating groove 13c. Thus the lugs 17e and 18a prevent axial displacement of bracket 17 but allow rotary movement of such bracket for positioning the saw for cutting or transport as will be later described.

A clutch mechanism indicated generally by the numeral 20 and a chain saw drive sprocket 25 are mounted on a stub shaft 21. Shaft 21 comprises a bolt-like member having a cylindrical head portion 21a and a squared portion 21c terminating in a threaded end 21b. Shaft 21 is axially mounted on a circular plate 22 having an axial hole 22a which is counterbored as shown at 22b to receive the headed end 21a of shaft 21. A second counterbore 22c opening to the forward face of circular plate 22 is provided ahead of counterbore 22b and the head 21a of shaft 21 is secured by welding to the bottom of counterbore 22c. Plate 22 and shaft 21 may be considered as a connector unit. Plate 22 has an integral hub portion 22d which is provided for a purpose to be presently explained. Plate 22 is secured to the rearwardly disposed face of flange 14 by a plurality of screws 23. When plate 22 is so secured to flange 14, the axis of shaft 21 is then coincident with the axis of the shaft portion 14a of flange 14.

The saw sprocket 25 is provided with an axial hole 25a to surround hub portion 22d as will be presently explained. Sprocket 25 is secured to a circular clutch plate 24 by a plurality of screws 25b. An integral, axial, cylindrical boss 24a is provided on the rearwardly disposed face of clutch plate 24 and a transverse diametrically disposed rectangular groove 24b (Figs. 1 and 3) is provided on the rearwardly disposed face of boss 24a. Clutch plate 24 is provided with an axial hole 24c which permits mounting such plate on stud 21.

A slip type clutch 26 comprising two halves 26a and 26d is then mounted on stud 21 to permit slippage of the driving flange 14 in the event of an overload of the saw as will be later described. One half 26a of clutch 26 is provided with a circular aperture to freely surround stub shaft 21, and with an integral diametrically disposed key 26b which engages groove 24b provided in clutch plate 24 to effect a driving connection between such plate and the clutch half 26a. The rearwardly disposed face of clutch half 26a is provided with a plurality of radially spaced teeth 26c. The other half 26d of clutch 26 has a plurality of teeth 26e which cooperate with teeth 26c in driving relationship. Clutch half 26d has a rectangular aperture to fit snugly over the squared end portion 21c of shaft 21 and such clutch is maintained in driving relationship with clutch half 26a by a spring 27, which spring is suitably tensioned by a nut 28 screwed on to threaded end 21b of stud 21. A washer 29 is preferably placed between spring 27 and nut 28.

The forward end of saw guide 15 is arcuately shaped as shown at 15b in order that such end may be positioned closely adjacent the periphery of sprocket 25. A saw chain 30 of conventional construction surrounds sprocket 25 and the peripheral edge of saw guide 15 as best shown in Figs. 1 and 2. Saw chain 30 passes through the aperture 16c defined by handle 16, and sprocket 25 drives such chain about guide 15. Saw chain 30 is suitably tensioned by loosening bolts 17b and longitudinally moving guide 15 as permitted by slotted apertures 15c, and then retightening bolts 17b.

The power operated lift arms 10a of tractor 10 may be conveniently utilized for vertically raising this improved chain saw to a transporting position and for manipulating the saw during cutting. A simple arrangement for providing an operative connection between the lift arms 10a and saw guide 15 is shown in Figs. 1 and 2. In the yoke shaped or forked ends of the lift arms 10a there is respectively secured a pair of eye bolts 36. A transverse hole 35a is provided in the saw guide 15 through which a chain, rope or cable 35 is inserted. The ends of cable 35 are then respectively secured to the pair of eye bolts 36 carried by the forked ends of lift arms 10a. It will be apparent that cable 35 will also act to stabilize the saw when extended for cutting.

In the operation of the improved chain saw herein described, the tractor is backed up to a felled tree or log lying on the ground with the tractor wheels disposed generally perpendicular to the axis of the tree or the log as in Fig. 2. The saw is lowered into cutting relationship with the log by lowering the tractor lift arms 10a by the hydraulic control lever (not shown). When the saw is contacting the log, the power-take-off shaft is engaged in the usual manner whereupon the sprocket 25 is rotated to drive the chain saw 30. The weight of the saw is sufficient so that the force of gravity alone will feed the saw through the log in which event the tractor lift arms 10a are fully lowered, or the feed of the saw may be controlled by such lift arms. When the saw has passed through the log, the chain saw is conveniently raised to an elevated position by manipulation of the tractor's hydraulic control lever (not shown) to raise lift arms 10a.

The improved chain saw of this invention may also be utilized for felling trees. When such use of the saw is desired, the pulley housing 13 is positioned on the tractor rear axle housing 11 with the axis of flange 14 disposed vertically downwardly. When used in this position, however, it is necessary to disconnect the cable 36 from the lift arms which, of course, precludes their use for manipulation of the saw and will thus preferably require the use of two operators in tree felling, one to feed the saw into the tree and the other to operate the tractor. Which ever way the saw is used, whether for felling trees or for sawing up felled trees or logs, upon hitting an obstruction or other binding of the saw chain 30, clutch 26 will slip thereby preventing damage to either the saw or the tractor.

From the above description, it is apparent that there is here provided a chain saw for mounting on a tractor and powered by the power-take-off shaft of the tractor which is of simple design and hence of relatively inexpensive construction and is therefore cheap to manufacture. Such saw, however, is sturdily built to withstand rigorous and continuous sawing. A further advantage of this saw resides in the use of a tractor which provides a convenient source of power for powering such saw, thereby eliminating the need for an individually powered chain saw. This feature alone is of considerable worth to the individual who possesses a tractor but does not have a sufficient volume of sawing to warrant the purchase of a self-powered saw. In addition the saw is conveniently transported on the tractor to the working site and may be readily raised or lowered by the power operated lift arms of the tractor.

It will, of course, be understood that various details of construction may be varied through a wide range without departing from the principles of this invention and it is, therefore, not the purpose to limit the patent granted hereon otherwise than necessitated by the scope of the appended claims.

I claim:

1. For use with a tractor having a power-take-off pulley attachment including a housing and a power-driven flange, a chain saw comprising a plate-like guide member, bracket means for pivotally mounting said guide member on the housing, a sprocket mounted on the power-driven flange, a saw chain surrounding said guide member and said sprocket, said sprocket driving said saw chain about said guide member, and clutch means operative between said sprocket and said flange permitting slippage of said sprocket upon binding of said saw chain.

2. A chain saw attachment for a tractor having a power-take-off element, comprising in combination, an elongated guide member defining a portion of a peripheral track for a chain saw, means for supporting said guide member on the tractor adjacent said power-take-off element, a sprocket cooperating with said guide member to complete the peripheral track for the chain saw, means for rotatably mounting said sprocket coaxially with the power-take-off element, and an overload release clutch normally connecting said sprocket to the power shaft in driving relation.

3. A chain saw attachment for a tractor having a power-take-off element, comprising, in combination, a drive connector unit having a shaft portion, means for detachably securing said connecting unit to the power-take-off element with said shaft portion coaxial therewith, an elongated guide member defining a portion of a peripheral track for a chain saw, means for supporting said guide member on the tractor adjacent said power-take-off element, a sprocket rotatably mounted on said shaft portion and cooperating with said guide member to complete the peripheral track for the chain saw, and an overload release clutch normally connecting said sprocket to said shaft portion for rotation therewith.

4. For use with a tractor having a power operated vertically movable lift arm and a power-take-off pulley attachment including a housing and a power driven flange, a chain saw comprising a plate-like guide member, bracket means for pivotally mounting said guide member on the housing, a sprocket mounted on the power-driven flange, a saw chain surrounding said guide member and said sprocket, said sprocket driving said saw chain about said guide member, clutch means operative between said sprocket and said flange permitting slippage of said sprocket upon binding of said saw chain, and means operatively connecting said chain saw with the lift arm for raising said chain saw.

5. For use with a tractor having a pair of power operated vertically movable lift arms and a power-take-off pulley attachment including a housing having a substantially cylindrical stem portion and a power-driven flange projecting from the stem portion, a chain saw comprising a plate-like guide member, a bracket detachably pivotally mounted on the cylindrical stem portion of the housing, means securing said guide member to said bracket for limited longitudinal adjustment, a sprocket mounted on the power-driven flange, a saw chain surrounding said guide member and said sprocket, said sprocket driving said saw chain about said guide member, and means operatively connecting said chain saw with the lift arms for raising said chain saw.

References Cited in the file of this patent

UNITED STATES PATENTS

| Number | Name | Date |
|---|---|---|
| 951,510 | Muir | Mar. 8, 1910 |
| 1,176,967 | Komarnisky | Mar. 28, 1916 |
| 1,350,043 | Stitt | Aug. 17, 1920 |
| 1,798,402 | Dibble | Mar. 31, 1931 |
| 2,348,588 | Arsneau | May 9, 1944 |
| 2,420,836 | Nelson | May 20, 1947 |
| 2,489,772 | Hall | Nov. 29, 1949 |